United States Patent
Velpari

(10) Patent No.: US 6,582,511 B1
(45) Date of Patent: Jun. 24, 2003

(54) USE OF E-GLASS FIBERS TO REDUCE PLASTIC SHRINKAGE CRACKS IN CONCRETE

(75) Inventor: Vedagiri Velpari, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/979,861

(22) PCT Filed: May 23, 2000

(86) PCT No.: PCT/US00/14158

§ 371 (c)(1),
(2), (4) Date: Nov. 26, 2001

(87) PCT Pub. No.: WO00/71484

PCT Pub. Date: Nov. 30, 2000

Related U.S. Application Data

(60) Provisional application No. 60/136,036, filed on May 26, 1999.

(51) Int. Cl.[7] ............................................. C04B 14/38
(52) U.S. Cl. ................................................... 106/711
(58) Field of Search ........................................ 106/711

(56) References Cited

U.S. PATENT DOCUMENTS

| | | |
|---|---|---|
| 3,902,912 A | 9/1975 | Wolf |
| 4,008,094 A | 2/1977 | Beall et al. ................... 106/99 |
| 4,036,654 A | 7/1977 | Yale et al. .................... 106/52 |
| 4,072,534 A | 2/1978 | Ryder |
| 4,147,555 A | 4/1979 | Cohen et al. |
| 4,164,532 A | 8/1979 | Piazza |
| 4,293,343 A | 10/1981 | Shannon |
| 4,454,285 A | 6/1984 | Bijen ............................ 524/5 |
| 4,543,159 A | 9/1985 | Johnson et al. |
| 4,689,084 A | 8/1987 | Ambroise et al. ............ 106/99 |
| 4,882,302 A | 11/1989 | Horischi et al. .............. 501/27 |
| 4,935,301 A | 6/1990 | Rerup et al. ................. 428/375 |
| 5,064,785 A | 11/1991 | Kawamoto et al. .......... 501/72 |
| 5,298,071 A | 3/1994 | Vondran ..................... 106/757 |
| 5,456,752 A | 10/1995 | Hogan |
| 5,628,822 A | 5/1997 | Hogan ........................ 106/802 |
| 5,643,359 A | 7/1997 | Soroushian et al. ........ 106/805 |
| 5,993,537 A | 11/1999 | Trottier et al. |

FOREIGN PATENT DOCUMENTS

| | | |
|---|---|---|
| JP | 6 87326 | 4/1994 |
| WO | 95/06086 A | 3/1995 |
| WO | 99/46214 A | 9/1999 |

OTHER PUBLICATIONS

*The Manufacturing Technology of Continuous Glass Fibers*, by K. L. Loewenstein (3rd Ed 1993) pp. 30–35, 238–285. No month.
*Synthetic Industries'*, "Fiber Reinforced Concrete", 1/99.
*Handbook of Composites*, vol. 1; (1985) Elsevier Science Publishers B.V.; "Alkali–Resistant Glass Fibres"; pp. 61–85. No month.
*Cement & Concrete Composites 18*, (1996) Elsevier Science Limited; "Mechanical Behaviour of Cementitious Matrix Composites", A. G. Magalhaes, A.T. Marques, F.M.F. Oliveira, P. Soukatchoff, P.T.deCastro; pp. 9–22. No month.
Chemical Abstracts, May 1983, 98, No. 22, Columbus,Ohio; XP000184464.
The Manufacturing Technology of Continuous Glass Fibres, by K.L. Loewenstein (3rd Ed 1993) pp. 47–85. No month.

*Primary Examiner*—Elizabeth D. Wood
(74) *Attorney, Agent, or Firm*—Andrew C. Siminerio; Dennis G. Millman

(57) ABSTRACT

The present invention provides concrete having improved plastic shrinkage crack resistance, comprising: concrete; and non-alkaline resistant glass fibers. The present invention also provides a method of reducing plastic shrinkage cracks in concrete, comprising the steps of: combining cement, aggregate, sand, and water to form concrete; adding a desired amount of non-alkaline resistant glass fibers to the concrete; and mixing the concrete and glass fibers to disperse the glass fibers uniformly throughout the concrete, wherein the glass fibers reduce the amount of plastic shrinkage cracks of the concrete as compared to non-fiber reinforced concrete.

23 Claims, No Drawings

USE OF E-GLASS FIBERS TO REDUCE PLASTIC SHRINKAGE CRACKS IN CONCRETE

CROSS REFERENCE TO RELATED PATENT APPLICATION

This application claims priority to PCT International Application No. PCT/US00/14158, filed May 23, 2000, which claims the benefit of U.S. Provisional Application No. 60/136,036, filed May 26, 1999.

BACKGROUND OF THE INVENTION

1. Field of the Invention

The present invention relates to reinforcements for concrete, and in particular, the use of E-glass fibers for reducing plastic shrinkage cracks in concrete.

2. Technical Considerations

Concrete is a well known and widely used construction material.

As concrete is fundamentally weak in tension and has low ductility, fibers have been used to reinforce concrete. A primary function of the fibers is to arrest advancing cracks and delay their propagation across the concrete matrix by distributing the shrinkage stresses. For example, due to high shrinkage during initial curing and setting of concrete (i.e. the first 24 hours), concrete tends to develop fine, hairline shrinkage cracks. These cracks enlarge over time and permit carbonation, and allow corrosive salts to penetrate and corrode the concrete and steel reinforcing. In addition, freeze-thaw cycles further accelerate the growth of these cracks and the accompanying deterioration of the concrete. As a result of the reduction in plastic shrinkage cracks, the long-term durability of the concrete is improved.

To prevent the formation of these shrinkage cracks, synthetic fibers, and preferably polypropylene and nylon fibers, are typically added to the concrete during the mixing stage. However, due to the difference in densities between the concrete ingredients and the polymeric fibers, the polymeric fibers have a tendency to segregate themselves from the other materials in the concrete mix and float to the upper portions of the setting concrete. This segregation of the polymeric fibers in the concrete reduces the overall effectiveness of the fibers in reducing shrinkage cracks as well as lower its aesthetic value. In the concrete industry, this condition is sometimes referred to as "fuzzy concrete". In addition, the adhesion of polymeric fibers to the cement in concrete is poor, thus reducing the effectiveness of the fibers in preventing shrinkage cracks from forming.

The effectiveness of glass fibers as reinforcements is reduced because glass fibers are generally brittle and therefore are prone to damage or strand separation by impact and abrasion during conventional concrete mixing processes. In addition, E-glass fibers are not used to reinforce concrete because the glass fibers deteriorate in the alkaline environment of the cement. This characteristic of E-glass resulted in the development of alkaline resistant glass fibers and coatings.

U.S. Pat. No. 5,298,071 discloses a fiber-hydratable cement composition made by combining fibers with cement clinkers in a grinding mill and grinding the mixture into a fine powder. The fibers can be alkaline resistant glass, ceramic, carbon, or organic polymer, and preferably steel, polyolefin or mixtures thereof.

U.S. Pat. No. 5,628,822 discloses a concrete reinforce with synthetic fibers having a variety of different fiber designs comprising variations in length, width, thickness, denier, fibrillation and aspect ratios. The fiber is preferably made of polypropylene.

U.S. Pat. No. 4,935,301 discloses a cement composite containing bundles of glass fibers encapsulated, rather than impregnated, with a polymeric coating.

U.S. Pat. No. 5,643,359 discloses reinforcing concrete with pulp fiber from wood and non-wood plants or recycled paper products. The fibers are about 0.1 to 30 mm long and about 0.001–0.1 mm in diameters.

JP 6[1994]-87,326 discloses coating glass fibers with a mixture of silicone and thermoplastic resins to provide alkaline resistant glass fibers.

U.S. Pat. Nos. 4,008,094; 4,036,654 and 5,064,785 discloses glass compositions that include zirconium to provide the glass with high alkaline resistance. U.S. Pat. No. 4,882,302 discloses alkaline resistant glasses that include at least one lanthanide series metal oxide.

It would be advantageous to provide a fiber material that is less expensive than specially formulated alkaline resistant glass compositions or other synthetic fibers and is effective in reducing plastic shrinkage cracks in concrete.

SUMMARY OF THE INVENTION

The present invention provides concrete having improved plastic shrinkage crack resistance, comprising: concrete; and non-alkaline resistant glass fibers. In one nonlimiting embodiment of the invention, the non-alkaline resistant glass fibers are E-glass fibers that comprise at least 0.025 percent by volume of the concrete, and the fibers have lengths ranging from 1.27 cm to 5.08 cm and diameters ranging from 5 micrometer to 23 micrometers.

The present invention also provides a method of reducing plastic shrinkage cracks in concrete, comprising the steps of: combining cement, aggregate, sand, and water to form concrete; adding a desired amount of non-alkaline resistant glass fibers to the concrete; and mixing the concrete and glass fibers to disperse the glass fibers uniformly throughout the concrete, wherein the glass fibers reduce the amount of plastic shrinkage cracks of the concrete as compared to non-fiber reinforced concrete. In one nonlimiting embodiment of the invention, the fibers are E-glass fibers that comprise at least 0.025 percent by volume of the concrete, and the fibers have lengths ranging from 1.27 cm to 5.08 cm and diameters ranging from 5 micrometer to 23 micrometers.

DETAILED DESCRIPTION OF THE INVENTION

The present invention provides concrete having reduced plastic shrinkage cracks. More specifically, the present invention uses of non-alkaline resistant glass fibers, and in particular E-glass fibers, as reinforcement for concrete to reduce the occurrence of plastic shrinkage cracks. As used herein, the term "non-alkaline resistant glass fibers" means that the glass fibers do not include specific materials in the amounts required to enhance the fiber's alkaline resistance, and the fibers are not coated or encapsulated with a coating formulated to enhance the fiber's alkaline resistance. Although not limiting in the present invention, materials traditionally added to a silicate glass fiber composition to specifically improve alkaline resistance include, but are not limited to, zirconium oxide and lanthanide series oxides. For example, zirconium oxide is added to glass compositions typically in the range of 10 to 25 wt % to increase alkaline resistance. Furthermore, as used herein, the term "concrete" means the combination of hydraulic cement, aggregate, sand and water, the term "plastic shrinkage cracks" means the cracks formed in the concrete that occur within the first 24 hours after casting of the concrete, and the terms "resistance against alkaline attack" and "alkaline resistance" mean that the fibers will not react with the constituents in the concrete, and in particular the lime in the cement. As discussed above, the preferred non-alkaline resistant glass in the present invention is E-glass.

It should be appreciated that numerical values discussed herein, such as but not limited to fiber dimensions, temperatures, percent by volume of material or weight percent of material, are approximate and are subject to variations due to various factors well known to those skilled in the art such as, but not limited to, measurement standards, equipment and techniques. For example, where it states in the present application that the E-glass fibers comprise at least 0.025 percent by volume of the concrete, this is about 0.025 percent by volume, and where it states that a fiber length ranges from 1.27 cm to 5.08 cm, this range is about 1.27 cm to about 5.08 cm.

The mechanism for the development of such cracking is a complex process. Conceptually, it can be assumed that the concrete shrinks as it hardens and develops cracks when restrained from free movement. The primary factors related to the size and number of plastic shrinkage cracks include the amount of shrinkage, type of restraint, the constituents in the concrete, and the tensile strength of the concrete during the hardening process. In most cases, the majority of the plastic shrinkage cracks occur within the first 24 hours after the concrete is poured.

The present invention is directed toward short-term crack abatement of concrete. As a result, resistance against alkaline attack of any type of reinforcement material from the other ingredients in the concrete mix is not a requirement. Because alkaline resistance is not necessary, the present invention uses non-alkaline glass fibers, and in particular, E-glass fibers to reduce the plastic shrinkage cracks. The prior art discloses the use of glass fibers in concrete, but such glass fibers are used for longer term reinforcement and are specially formulated and/or are coated to be resistant to alkaline attack and maintain their load-carrying capability over an extended period of time. More specifically, zirconium containing glass fibers or ECR glass fibers in the form of chopped strands are used for long-term reinforcement for the concrete. As reinforcing elements and load bearing members, it is preferred that these chopped strands remain intact in the mix. More particularly, if the fibers separate from the strands during mixing, the strength of the strand is reduced and its effectiveness as a reinforcing element is diminished. As a result, the coating composition, sometimes referred to as sizing or binder, used to coat these types of glass fibers for reinforcing strands are generally formulated to help the strand retain the individual fibers, and if required, resist alkaline attack.

The use of E-glass fiber compositions in the concrete to reduce the shrinkage cracks has several advantageous over other types of reinforcing fibers. For example, E-glass is the most commonly produced glass fiber. For more information regarding E-glass compositions and their production, see K. Loewenstein, *The Manufacturing Technology of Continuous Glass Fibres*, (Third Edition 1993) at pages 30–35 and 47–85, which teachings are incorporated by reference. In addition, E-glass is less expensive than zirconium containing glass fibers, ECR glass fibers, polypropylene fibers and nylon fibers. Furthermore, unlike when using fiber strands for structural reinforcement where it is important to maintain the strand integrity, when using E-glass to reduce plastic shrinkage cracks, it is very desirable to break up and separate the E-glass fiber strands to better distribute the fibers throughout the concrete. More specifically, breaking up the strands into individual fibers increases the surface area available to bond to the concrete. As a result and without limiting the present invention, in one embodiment, the glass fibers are coated with sizing compositions that are easily broken down in water and are not strong film former, e.g. the sizing compositions do not include constituents that will significantly crosslink when dried. The violent mixing of the cement and other raw materials used in the concrete facilitates this desired separation of the glass fibers from the fiber strands so as to make the E-glass fibers more effective in reducing shrinkage cracks. The separation of the fibers from the fiber strand is further facilitated by using coated E-glass fibers having a low loss on ignition (LOI). LOI is a commonly used measure of the amount of coating on the glass fibers, and more particularly is the ratio of the weight of the coating to the weight of the coated fiber expressed as a percent. Although not limiting in the present invention, in one embodiment, the E-glass fibers have an LOI of no greater than 1, preferably no greater than 0.75, and more preferably no greater than 0.50.

Another advantage is that E-glass fibers are finer than the polypropylene or nylon fibers typically used for concrete reinforcement, so that there is more surface area for bonding. More particularly, polymeric fibers used for concrete reinforcement typically have a diameter ranging from 20 to 100 microns ($1 \times 10^{-6}$ m) while the E-glass fibers of the present invention have a diameter ranging from 5 to 20 microns. Also, E-glass fibers have a density similar to that of the concrete ingredients. As a result, the fibers will be better integrated within the concrete mix and not segregate from the concrete mix materials and float toward the surface during pouring and setting as is the tendency for polypropylene and nylon reinforcing fibers, thus providing and maintaining better fiber distribution throughout the concrete.

As discussed above, alkaline attack is not an issue when using E-glass fibers for reducing plastic shrinkage cracks because the utility of the E-glass fibers is in their use during the first 24 hours after the concrete has been cast. As a result, there is no need to coat the glass fibers or encapsulate the fiber strands with specialized coatings that provide alkaline resistance. Conventional sizing compositions that have not been modified to provide enhanced alkaline resistance can be used to coat the fibers. Although not limiting in the present invention, if desired the E-glass fibers of a glass fiber strand can be coated with a sizing composition tailored to facilitate easy dispersion of the strands in the concrete mix. Such compositions would be easily broken down in water and include weak film forming materials, and the coated fibers would have a low LOI, as discussed above. If desired, the coating compositions can also be formulated to promote adhesion between the fibers and strands and the concrete.

It is believed that much of the glass fiber sizing composition will be removed from the glass fibers during the violent concrete mixing operation. As a result, unless the sizing composition is formulated to adhere to and remain on the glass fibers, it is expected that the E-glass fibers in the present invention can have either a conventional starch-oil sizing, which is typically used on glass fiber yarns in the textile industry, or a reinforced polymer sizing, which is typically used in the reinforced plastics industry. For more information on these types of glass fiber coating compositions, see Loewenstein at pages 238–285, which are hereby incorporated by reference.

Because the desired shrinkage crack preventing properties of the E-glass fibers are required for only a short period of time, the quantity of fibers added to the concrete in order to reduce or eliminate the plastic shrinkage cracks is small. In one nonlimiting embodiment of the present invention, E-glass fibers are added to the concrete on the order of at least 0.025 percent of the volume of the concrete, preferably at least 0.075 percent, and more preferably at least 0.1 percent, to reduce plastic shrinkage cracks during the initial setting and curing of the concrete. Furthermore, since the utility of the E-glass in the present invention is its contribution in reducing plastic shrinkage cracks in the short term, i.e. within the first 24 hours after casting, and the amount of E-glass fibers necessary to reduce the plastic shrinkage cracks is so low, any subsequent chemical attack on the glass fibers by the concrete will not have any bearing on the final properties of the concrete.

Although not limiting in the present invention, in one embodiment of the invention the glass fibers have a diameter ranging from 5 micrometers to 23 micrometers, and preferably between 6 micrometers to 16 micrometers. It is believed that the smaller diameter fibers will provide more surface area per volume of glass so as to provide better bonding between the fibers and concrete and thus reduce plastic shrinkage cracks. In another nonlimiting embodiment of the present invention, the E-glass fibers are 0.5 inches to 2 inches (1.27 cm to 5.08 cm) long, and preferably 0.75 inches to 1.25 inches (about 1.91 cm to 3.18 cm) long. It should be appreciated that the concrete of the present invention can include combinations of different fiber diameters and different fiber lengths.

The following tests were conducted to evaluate the effectiveness for E-glass fibers in reducing plastic shrinkage cracks in concrete.

Test 1

Tests were conducted using 2 inch (5.08 cm) thick concrete slabs that were 3 feet long by 2 feet wide (0.91 meters by 0.61 meters). The slabs were restrained about their perimeter using wire mesh.

The cracks started to develop in 3 to 3.5 hours after casting. In most cases the cracking was complete within 8 hours. The crack widths and lengths were measured after 24 hours. The longer duration was chosen to make sure that all the cracks were developed and stabilized. The crack width was measured at a number of locations along the length of the crack. The length of the crack was multiplied by the average crack width to calculate the total crack area of a given concrete slab.

The total crack area of the control slab (i.e. no fibers) was taken as 100 percent and the crack area of the test slabs which included the E-glass fibers was expressed as a percentage of the control slab and the percent reduction of the crack area as compared to the control slab was obtained.

The major factors that will influence the formation of plastic shrinkage cracks are the cement content, the water to cement ratio, the maximum size of the coarse aggregates, the wind velocity, the humidity and the ambient temperature. The plastic shrinkage will be higher with a (a) higher cement content, (b) higher water content, (c) higher ambient temperature, (d) higher wind velocity, (d) lower humidity, and (e) smaller maximum size of coarse aggregate. In order to study the influence of the addition of E-glass fibers, the concrete was formulated and the testing conditions were established to provide a high potential for plastic shrinkage cracks. The mix proportions for 4 different concrete batches is shown below in Table 1.

TABLE 1

|  | Batch A | Batch B | Batch C | Batch D |
|---|---|---|---|---|
| ASTM Type I cement (lbs.) | 986 | 883 | 855 | 980 |
| water (lbs.) | 434 | 441 | 427 | 588 |
| water/cement | 0.44 | 0.5 | 0.5 | 0.6 |
| concrete sand (lbs.) | 1215 | 1600 | 1062 | 1100 |
| coarse aggregate (lbs.) | 1215 | 1600 | 1062 | 1100 |
| max. size of aggregate (in.) | 0.75 | 0.75 | 0.75 | 0.375 |
| 7 day compressive strength (psi) | 4855 | 4150 | 3720 | — |

During testing, the slabs were exposed to an ambient temperature between 68° F. to 70° F. (20° C. to 21° C.), and a humidity of 28% to 32%. In addition, immediately after casting, the slabs were placed on a flat surface and subjected to a wind velocity of 14 mph, using high velocity fans.

Three different types of fibers were tested. The first fiber was a wet chop product, i.e. the fibers were chopped, packed and used wet. More specifically, the first fiber was a wet chop product commercially available from PPG Industries, Inc. of Pittsburgh, Pa. and identified as 8239 wet chop, which included a polymeric fiber coating composition that is specially formulated for good water dispersion. This product is typically used in paper products, e.g. roofing shingles. The chopped strands included M2.18 E-glass fiber strands ($6.4 \times 10^{-4}$ inches/16.0 micrometer fiber diameter) and were 1.25 inches (3.18 cm) long. The average moisture content of the first fiber sample was about 15.6 percent. The second and third fibers were a dry chop product, i.e. the fibers were chopped, packed and used dry. More specifically, the second fiber was a DE-chop fiber commercially available from PPG Industries, Inc. and identified as DE-610, which included a starch-oil fiber coating composition. This product is typically used in specialty paper and filter applications. The chopped strands included DE75 E-glass fiber strands ($2.5 \times 10^{-4}$ inches/6.0 micrometer fiber diameter) and were 1 inch (2.54 cm) long. The third fiber was a chopped T-fiber commercially available from PPG Industries, Inc. and identified as Hybon® 2464 roving, which included a amino-silane fiber coating composition. This product is typically used in reinforced polymeric panels. The chopped strands included T250 E-glass fiber strands ($9.2 \times 10^{-4}$ inches/23.0 micrometer fiber diameter) and were 1 inch (2.54 cm) long.

The mixing of each concrete was done in a 9 cubic feet capacity mixer. The coarse aggregate, sand and two-thirds of the water were added to the mixer and mixed for about one minute. The cement, remaining water and the fibers were then added and the concrete constituents were mixed for 3 minutes, followed by a 3 minute rest period and a final mixing period of about 2 minutes. The slabs were then cast and finished. No segregation or balling of the fibers was observed in any concrete mixture.

Table 2 is a summary of test results.

TABLE 2

| Batch | Percent by volume of fibers | Fiber Type | Crack Area Reduction (%) |
|---|---|---|---|
| A | 0.1 | wet chop | 98 |
| B | 0.1 | T-fiber | 91 |
| C | 0.075 | wet chop | 99 |
| C | 0.075 | T-fiber | 95 |

TABLE 2-continued

| Batch | Percent by volume of fibers | Fiber Type | Crack Area Reduction (%) |
|---|---|---|---|
| D | 0.1 | T-fiber | 75 |
| D | 0.1 | DE-chop | 83 |
| D | 0.2 | T-fiber | 95 |
| D | 0.2 | DE-chop | 100 |

As can be seen in this test, all the fibers were effective in reducing plastic shrinkage cracks, even at volume percents as low as 0.075. This is particularly significant when compared to polypropylene and nylon fibers that are used to reduce plastic shrinkage cracks. More specifically, the recommended addition of these types of fibers generally varies from 1.0 to 1.5 lbs./cu.yd (0.06 to 0.1 volume percent) and the expected percent reduction in plastic shrinkage cracks varies from 55 to 70 percent. As a result, the low plastic shrinkage cracks experienced by the E-glass fiber containing concrete slabs is even more significant since, as discussed earlier, the concrete batches were formulated to enhance cracking.

Test 2

This test used the same size slabs, the same mixing procedure, the same general testing conditions, and the same measuring procedure to determine reduction in plastic shrinkage crack as discussed above for Test 1. The concrete mix used to form test slabs is shown in Table 3.

TABLE 3

|  | Batch E |
|---|---|
| ASTM Type I cement (lbs.) | 962 |
| water (lbs.) | 481 |
| water/cement | 0.5 |
| concrete sand (lbs.) | 1185 |
| coarse aggregate (lbs.) | 1185 |
| max. size of aggregate (in.) | 0.75 |

The fibers tested in Test 2 were the same wet chop glass fiber product described above in Test 1 (8239 wet chop from PPG Industries) except the chopped fibers were 0.75 inches (1.91 cm) long. For comparison purposes, tests were also run with 0.75 inches (1.91 cm) STEALTH® multifilament polypropylene fibers commercially available from Synthetic Industries, Inc., Georgia. For more information regarding the STEALTH fibers, see Synthetic Industries' publication, "Fiber Reinforced Concrete", January 1999, which is hereby incorporated by reference. The fibers were added at 0.025, 0.05, 0.075, 0.1 and 0.2 percent by volume of the concrete.

Table 4 shows the percentage crack reduction for the glass fibers and polypropylene fibers at the various fiber content levels.

TABLE 4

| Percent by volume of fibers | % reduction in plastic shrinkage cracks | |
|---|---|---|
|  | Glass fibers | polypropylene |
| 0.025 | 90 | 93 |
| 0.05 | 97 | 89 |
| 0.075 | 92 | 85 |
| 0.1 | 100 | 100 |
| 0.2 | 100 | 100 |

As can be seen in Test 2, the glass fibers performed better than the polypropylene fibers at the lower volumes and showed comparable performance at the higher volumes.

Based on the results in Tests 1 and 2, it is clear that E-glass fibers can be used to reduce the amount of plastic shrinkage cracks in concrete as compared to non-fiber reinforced concrete.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

I claim:

1. Concrete having improved plastic shrinkage crack resistance, consisting essentially of:
   concrete; and,
   non-alkaline resistant glass fibers in an amount effective to reduce plastic shrinkage cracks as compared to a non-fiber reinforced concrete, wherein the glass fibers are susceptible to alkaline attack in the concrete.

2. Concrete according to claim 1, wherein the non-alkaline resistant glass fibers comprise E-glass fibers.

3. Concrete according to claim 2, wherein the E-glass fibers comprise at least 0.025 percent by volume of the concrete, and the fibers have lengths ranging from 1.27 centimeters to 5.08 centimeters and diameters ranging from 5 micrometers to 23 micrometers.

4. Concrete according to claim 3, wherein the E-glass fibers comprise at least 0.1 percent by volume of the concrete, and the fibers have lengths ranging from 1.9 centimeters to 3.18 centimeters and diameters ranging from 6 micrometers to 16 micrometers.

5. Concrete according to claim 2, wherein the E-glass fibers comprise at least 0.025 percent by volume of the concrete.

6. Concrete according to claim 5, wherein the E-glass fibers comprise at least 0.075 percent by volume of the concrete.

7. Concrete according to claim 6, wherein the E-glass fibers comprise between 0.025 and 0.2 percent by volume of the concrete.

8. Concrete according to claim 1, wherein the fibers have lengths ranging from 1.27 centimeters to 5.08 centimeters.

9. Concrete according to claim 8, wherein the fibers have lengths ranging from 1.91 centimeters to 3.18 centimeters.

10. Concrete according to claim 1, wherein the fibers have fiber diameters ranging from 5 micrometers to 23 micrometers.

11. Concrete according to claim 10, wherein the fibers have fiber diameters ranging from 6 micrometers to 16 micrometers.

12. Concrete according to claim 1, where the fibers comprise a wet chop product.

13. Concrete according to claim 1, where the fibers comprise a dry chop product.

14. Concrete according to claim 1, wherein the fibers include a coating that facilitates separation of the fibers from a fiber strand.

15. Concrete according to claim 1, wherein the fibers include a coating that enhances adhesion between the fibers and the concrete.

16. Concrete according claim 1, wherein the glass fibers are essentially free of zirconium.

17. A method of reducing plastic shrinkage cracks in concrete, comprising:

obtaining concrete; and dispersing non-alkaline resistant glass fibers in the concrete, wherein the glass fibers comprise between 0.025 and 0.2 percent by volume of the concrete and wherein the resulting glass fiber reinforced concrete has a reduced amount of plastic shrinkage cracks as compared to non-fiber reinforced concrete.

18. The method according to claim 17, wherein obtaining concrete comprises combining cement, aggregate, sand, and water to form concrete.

19. The method according to claim 17, wherein dispersing glass fibers in the concrete comprises dispersing E-glass fibers in the concrete.

20. The method according to claim 19, wherein the E-glass fibers have lengths ranging from 1.27 centimeters to 5.08 centimeters and diameters ranging from 5 micrometers to 23 micrometers.

21. The method according to claim 17, further comprising coating the fibers with a coating that facilitates separation of the fibers from a fiber strand prior to dispersing the fibers in the concrete.

22. The method according to claim 17, further comprising coating the fibers with a coating that enhances adhesion between the fibers and the concrete prior to dispersing the fibers in the concrete.

23. Concrete having improved plastic shrinkage crack resistance, comprising:

concrete; and non-alkaline resistant glass fibers, wherein the glass fibers comprise between 0.025 and 0.2 percent by volume of the concrete.

* * * * *